(12) United States Patent
Harada

(10) Patent No.: US 8,714,573 B2
(45) Date of Patent: May 6, 2014

(54) VEHICLE BEARING APPARATUS

(71) Applicant: JTEKT Corporation, Osaka (JP)

(72) Inventor: Katsuyuki Harada, Yamatokoriyama (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/022,386

(22) Filed: Sep. 10, 2013

(65) Prior Publication Data

US 2014/0077473 A1 Mar. 20, 2014

(30) Foreign Application Priority Data

Sep. 18, 2012 (JP) .................................. 2012-204450

(51) Int. Cl.
*F16D 3/18* (2006.01)
*B60B 27/00* (2006.01)

(52) U.S. Cl.
CPC .............. *B60B 27/0026* (2013.01); *F16D 3/18* (2013.01); *B60B 27/0031* (2013.01); *B60B 27/0005* (2013.01)
USPC ..................... 280/124.125; 384/544; 384/589; 464/157

(58) Field of Classification Search
CPC ............ B60B 27/0031; B60B 27/0005; B60B 27/0026; F16D 2001/103
USPC ............. 280/124.125; 384/544, 589; 464/157
See application file for complete search history.

(56) References Cited

U.S. PATENT DOCUMENTS

| | | | |
|---|---|---|---|
| 7,857,520 B2 | 12/2010 | Langer et al. | |
| 2003/0146591 A1* | 8/2003 | Ouchi et al. | 280/93.512 |
| 2008/0175526 A1* | 7/2008 | Langer et al. | 384/544 |
| 2009/0245935 A1* | 10/2009 | Kamikawa et al. | 403/359.1 |
| 2010/0069166 A1* | 3/2010 | Gleasman et al. | 464/159 |
| 2010/0226604 A1* | 9/2010 | Nakagawa et al. | 384/513 |
| 2012/0281941 A1* | 11/2012 | Umekida et al. | 384/544 |
| 2012/0295719 A1* | 11/2012 | Tajima et al. | 464/140 |

FOREIGN PATENT DOCUMENTS

| | | |
|---|---|---|
| DE | 10 2005 016 427 A1 | 10/2006 |
| EP | 2 565 051 A2 | 3/2013 |
| JP | A-2010-83432 | 4/2010 |
| JP | A-2011-31682 | 2/2011 |

OTHER PUBLICATIONS

Extended Search Report issued in European Patent Application No. 13184052.2 dated Dec. 4, 2013.

* cited by examiner

*Primary Examiner* — Paul N Dickson
*Assistant Examiner* — Darlene P Condra
(74) *Attorney, Agent, or Firm* — Oliff PLC

(57) ABSTRACT

A first side-face spline of a hub spindle and a second side-face spline of a constant velocity joint each has a tooth tip formed by tip tilted surfaces tilted from tooth flanks constituting a tooth chevron, an internal angle of the tooth tip is set to be less than 180 degrees, and a tooth tip-side perpendicular distance, which is a perpendicular distance between a tooth tip virtual intersection and a first virtual plane is set larger than a bottom land-side perpendicular distance, which is a perpendicular distance between a bottom land virtual intersection and a second virtual plane.

1 Claim, 10 Drawing Sheets

OUTER SIDE ← AXIAL DIRECTION → VEHICLE BODY SIDE

VEHICLE BEARING APPARATUS

INCORPORATION BY REFERENCE

The disclosure of Japanese Patent Application No. 2012-204450 filed on Sep. 18, 2012 including the specification, drawings and abstract, is incorporated herein by reference in its entirety.

BACKGROUND OF THE INVENTION

1. Field of the Invention

The invention relates to a vehicle bearing apparatus.

2. Description of Related Art

There has been conventionally known a technique as described in Japanese Patent Application Publication No. 2010-83432 (JP 2010-83432 A), as a configuration of a vehicle bearing apparatus in which a drive shaft is connected to a hub spindle of a hub wheel such that rotation of the drive shaft is transmittable to the hub spindle. JP 2010-83432 A describes a technique in which a spline is formed on a vehicle body side flat end face of the hub spindle of the hub wheel, and a spline is formed also on an outer-side flat end face of a constant velocity joint disposed at an end portion of the drive shaft. Further, JP 2010-83432 A describes the following technique. In a state where tooth flanks of the splines formed on these two flat surfaces, that is, side-face splines are engaged with each other, pressure is applied to the engagement surfaces in a direction perpendicular to the engagement surfaces by fastening the hub spindle of the hub wheel and the constant velocity joint together, with a nut, from the axial direction of the hub spindle. In this way, the hub spindle and the constant velocity joint are connected to each other.

As illustrated in FIG. 8, when tooth tips 128, 148 of side-face splines 126, 146 of the hub spindle of the hub wheel and the constant velocity joint are each formed as a flat surface that is perpendicular to the direction of the axis of rotation of the hub spindle, the tooth tips 128, 148 may make surface contact with each other in a state where the tooth tips 128, 148 are opposed to each other. When the tooth tips 128, 148 are opposed to each other, even if pressure is applied to the hub spindle of the hub wheel and the constant velocity joint in the axial direction, a normal engagement state in which tooth flanks 127, 147 of the side-face splines 126, 146 make surface contact with each other is not achieved, and therefore the hub spindle of the hub wheel and the constant velocity joint are connected in an inappropriate engagement state.

In view of this, JP 2010-83432 A describes two techniques for preventing the above-described conventional side-face splines from being engaged inappropriately. The techniques described in JP 2010-83432 A are illustrated in FIGS. 9 and 10.

As the first technique, a side-face spline 226 of a hub spindle of a hub wheel has flat tooth flanks 227 and tooth tips 228 formed as curved surfaces, as illustrated in FIG. 9. Similarly, a side-face spline 246 of a constant velocity joint has flat tooth flanks 247 and tooth tips 248 formed as curved surfaces. The hub spindle of the hub wheel and the constant velocity joint are connected to each other by engaging the side-face spline 226 and the side-face spline 246 with each other through application of pressure in the axial direction. At this time, when the side-face spline 226 make line contact with the side-face spline 246 with the curved-surface portions of the tooth tips 228 and the curved-surface portions of the tooth tips 248 opposed each other, the tooth tips 228 slip down over the tooth tips 248 and move toward bottom lands 249. Similarly, the tooth tips 248 slip down over the tooth tips 228 and move toward bottom lands 229. Thus, the side-face spline 226 and the side-face spline 246 rotate relative to each other, and flat portions of the tooth flank 227 and flat portions of the tooth flank 247 make surface contact with each other, thereby achieving a normal engagement state.

As illustrated in FIG. 10 as the second technique, each side-face spline 326 of a hub spindle of a hub wheel is configured such that a tooth tip 328 on which flat tooth flanks 327 intersect each other is formed, and the whole tooth is formed in a shape of an acute triangle. Further, each bottom land 329 is formed in a shape corresponding to a tooth tip 348 of each side-face spline 346 of a constant velocity joint. Similarly, each side-face spline 346 of the constant velocity joint is configured such that the tooth tip 348 at which flat tooth flanks 347 intersect each other is formed, and the whole tooth is formed in a shape of an acute triangle. Further, a bottom land 349 is formed in a shape corresponding to the tooth tip 328 of each side-face spline 326 of the hub spindle of the hub wheel. The hub spindle of the hub wheel and the constant velocity joint are connected to each other by engaging the side-face spline 326 and the side-face spline 346 with each other through application of pressure in the axial direction. At this time, the tooth tips 328 of the side-face spline 326 and the tooth tips 348 of the side-face spline 346 may face each other. At this time, the tooth tips 328 move to slip down over the tooth flanks 347 and engage with the bottom lands 349. Similarly, the tooth tips 348 move to slip down over the tooth flanks 327 and engage with the bottom lands 329. Thus, the side-face spline 326 and the side-face spline 346 rotate relative to each other, and flat portions of the tooth flank 327 and flat portions of the tooth flank 347 make surface contact with each other, thereby achieving a normal engagement state.

However, the techniques described in JP 2010-83432 A have the following inconveniences. Initially, engagement portions of the side-face spline 226 and the side-face spline 246 described in the first technique are the flat portions of the tooth flanks 227 and the tooth flanks 247. However, in order to join the tooth flanks 227 and the tooth tip 228 together smoothly at the boundaries, the tooth flanks 227 and the tooth tip 228 are joined together so that portions near the boundaries have a partially round shape. Therefore, the portions of the tooth flanks 227, which are near the boundaries with the tooth tip 228, are not flat and do not engage with the tooth flanks 247. Therefore, the amount of the flat portion of each tooth flank 227 is decreased, which causes a decrease in the engagement area. The same applies to the boundaries between the tooth flanks 247 and the tooth tip 248.

In the second technique of connecting the hub spindle of the hub wheel and the constant velocity joint to each other, the whole tooth of each of the side-face splines 326, 346 is formed in a shape of an acute triangle, and each of the bottom lands 329, 349 has a shape corresponding to the acute triangle. Therefore, if the tooth tips 328, 348 do not completely match the bottom lands 329, 349, backlash may occur after the hub spindle of the hub wheel is fitted to the constant velocity joint.

SUMMARY OF THE INVENTION

One object of the invention is to provide a vehicle bearing apparatus configured to prevent a drive shaft and a hub spindle of a hub wheel from being connected to each other while tooth flanks of side-face splines are engaged with each other inappropriately, and to make it possible to both secure a sufficient area of engagement between the tooth flanks of the side-face splines and suppress occurrence of backlash during engagement.

An aspect of the invention relates to a vehicle bearing apparatus in which a drive shaft is connected to a hub spindle of a hub wheel such that rotation of the drive shaft is transmittable to the hub spindle. A first side-face spline is formed on an end face of the hub spindle of the hub wheel. A constant velocity joint is provided at an end portion of the drive shaft. A second side-face spline is formed on an end face of the constant velocity joint, the end face being opposed to the first side-face spline on the end face of the hub spindle of the hub wheel. Each of the first side-face spline and the second side-face spline has an annular engagement surface in which projected tooth chevrons and recessed tooth valleys are alternately formed so as to be continuous with each other. Each of the tooth chevrons of the engagement surface of the first side-face spline and the tooth chevrons of the engagement surface of the second side-face spline has a tooth tip formed into a projecting shape by tip tilted surfaces extending from tooth flanks constituting the tooth chevron and tilted with respect to the tooth flanks in such directions that the tip tilted surfaces intersect each other. An internal angle of the tooth tip, formed by the tip tilted surfaces, is set to be less than 180 degrees. Each of the tooth valleys of the engagement surface of the first side-face spline and the tooth valleys of the engagement surface of the second side-face spline has a bottom land at which surfaces extending from tooth flanks constituting the tooth valley in such directions that the surfaces are tilted with respect to the tooth flanks are connected to each other. When a virtual intersection at which the tooth flanks intersect each other when being extended on the tooth tip side is referred to as a tooth tip virtual intersection; an intersection at which the tip tilted surfaces intersect each other is referred to as a tooth tip vertex; among virtual planes perpendicular to a rotational central axis of the hub spindle of the hub wheel, a virtual plane intersecting the tooth tip vertex is referred to as a first virtual plane; a perpendicular distance between the tooth tip virtual intersection and the first virtual plane is referred to as a tooth tip-side perpendicular distance X; a virtual intersection at which the tooth flanks intersect each other when being extended on the bottom land side is referred to as a bottom land virtual intersection: among virtual planes intersecting the bottom land, a virtual plane closest to the bottom land virtual intersection is referred to as a second virtual plane, and a perpendicular distance between the bottom land virtual intersection and the second virtual plane is referred to as a bottom land-side perpendicular distance Y, the tooth tip-side perpendicular distance X is larger than the bottom land-side perpendicular distance Y.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
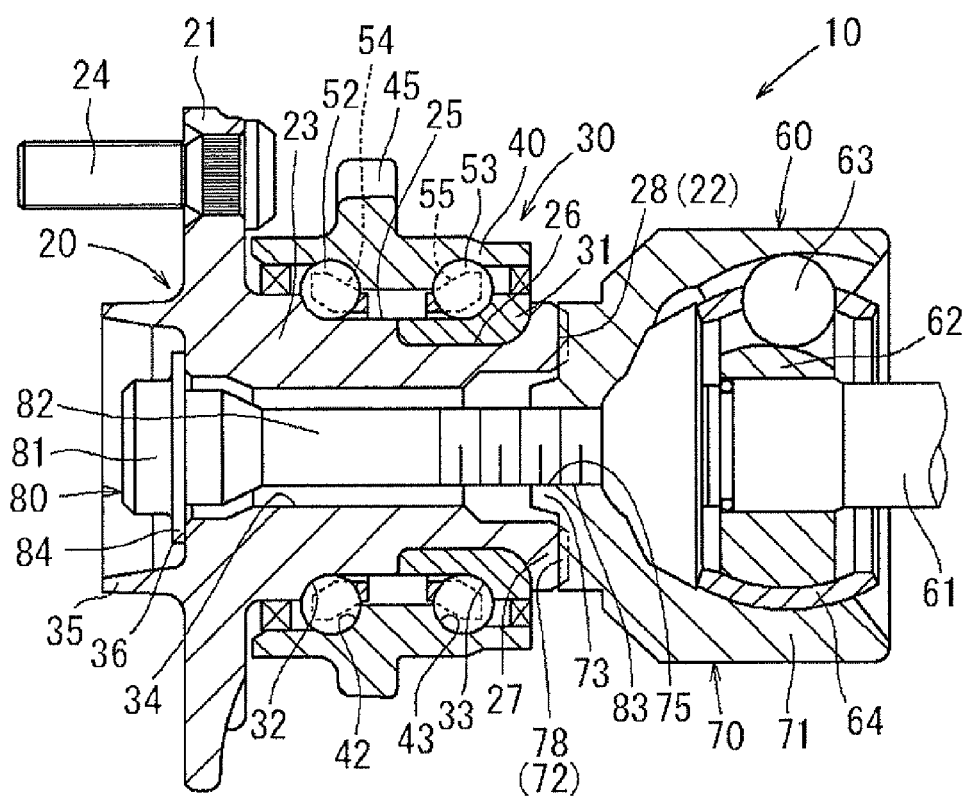
FIG. 1 is a view for describing a vehicle bearing apparatus according to an embodiment of the invention, and a sectional view of the vehicle bearing apparatus taken along its axial direction.
Figure 2:
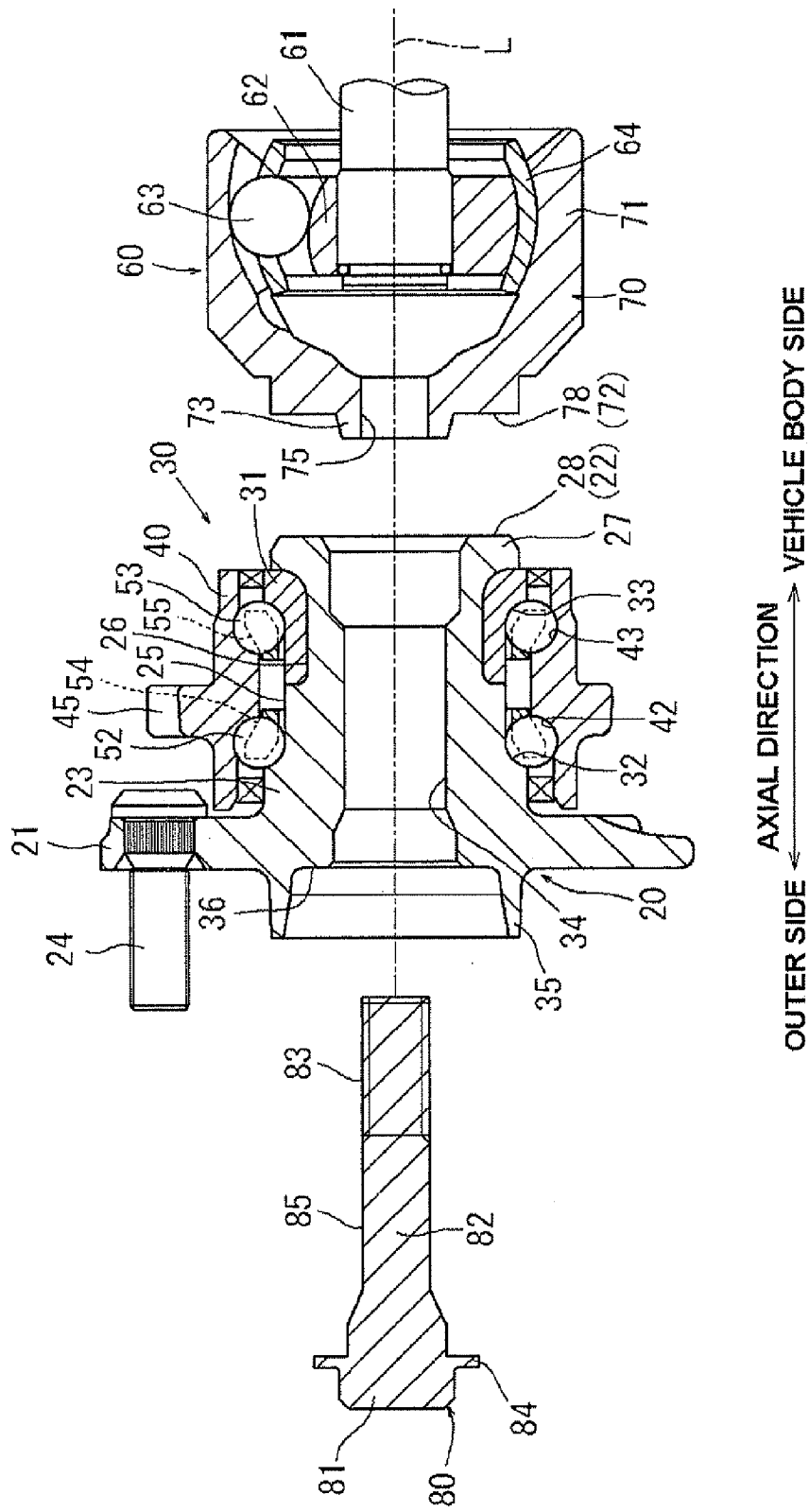
FIG. 2 is an exploded sectional view illustrating the vehicle bearing apparatus according to the embodiment, taken along the axial direction.

Hereinafter, a vehicle bearing apparatus according to embodiments of the invention will be described with reference to FIG. 1 to FIG. 7. As illustrated in FIG. 1 and FIG. 2, a vehicle bearing apparatus 10 in an embodiment of the invention mainly includes a hub wheel 20, a double row angular contact ball bearing 30 that serves as a rolling bearing, a constant velocity joint 60, and a bolt 80 with a washer.

The hub wheel 20 has a hub spindle 23 having a substantially cylindrical shape with a through-hole 34, as illustrated in FIG. 1 and FIG. 2. The hub spindle 23 is provided with a flange 21 that extends from the outer periphery of an end portion of the hub spindle 23, which is on the outer side in the axial direction of the hub spindle 23 (hereinafter, simply referred to as "outer side"). A wheel (not shown) is attached to the flange 21. A plurality of hub bolts 24 used to attach the wheel (not shown) to the flange 21 with a brake rotor (not shown) interposed therebetween is arranged at predetermined intervals and fixed to the flange 21 by press-fitting. The double row angular contact ball bearing 30 including an outer ring 40, an inner ring 31, a plurality of balls 52, 53 that serve as rolling elements, and cages 54, 55 is fitted onto the outer periphery of the hub spindle 23.

The hub spindle 23 is a single-piece member having a large-diameter shaft portion 25 and a small-diameter shaft portion 26. The large-diameter shaft portion 25 is formed on the flange 21 side. The small-diameter shaft portion 26 has a diameter smaller than that of the large-diameter shaft portion 25 and is formed so as to be continuous from the large-diameter shaft portion 25 via a step portion. An inner raceway surface 32 corresponding to an outer raceway surface 42 of the outer ring 40 is formed on the outer peripheral face of the large-diameter shaft portion 25. The inner ring 31 is formed in an annular shape, and an inner raceway surface 33 corresponding to an outer raceway surface 43 of the outer ring 40 is formed on the outer peripheral face of the inner ring 31. After the inner ring 31 is fitted to the outer peripheral face of the small-diameter shaft portion 26 of the hub spindle 23, an end portion of the small-diameter shaft portion 26 is clinched such that the outer diameter of the end portion is increased, so that a clinched portion 27 is formed. Thus, the inner ring 31 is fixed between the step portion and the clinched portion 27. On an annular end face 22 (located on the clinched portion 27 side) of the hub spindle 23, the annular end face 22 being on the vehicle body side in the axial direction (hereinafter, simply referred to as "vehicle body side"), a first side-face spline 28 is formed such that engagement surfaces thereof face the vehicle body side. At the end portion of the hub wheel 20, at which the flange 21 is formed, a fitting portion 35 to which the wheel is fitted is formed. A through-hole 34 that extends through the hub spindle 23 is formed along the central axis of the hub spindle 23. A bolt supporting face 36, which is opposed to a washer portion 84 formed on the outer periphery of a head 81 of the bolt 80 with a washer, is formed at part of the end portion of the hub spindle 23, the part being around the outer edge of the through-hole 34 on the side on which the fitting portion 35 is formed.

Further, between the outer raceway surfaces 42, 43 of the outer ring 40 and the inner raceway surfaces 32, 33 on the hub spindle 23 side, the balls 52, 53 and the cages 54, 55 that hold the balls 52, 53 are arranged, respectively. Further, a fixed flange 45 is formed integrally with the outer peripheral face of the outer ring 40. A vehicle body-side member (a knuckle or a carrier) supported by a suspension (not shown) of the vehicle is attached to the fixed flange with bolts. The end face 22 on the small diameter shaft portion 26 side, which is opposed to the constant velocity joint 60, in the present embodiment corresponds to "end face of a hub spindle of a hub wheel" in the invention.

As illustrated in FIG. 2, a tubular projecting portion 73 of the constant velocity joint 60 is inserted into the through-hole 34 from the small diameter shaft portion 26-side of the hub spindle 23, which is opposed to the constant velocity joint 60. The through-hole 34 is configured to connect the hub wheel 20 to the constant velocity joint 60 by inserting the bolt 80 with a washer into the through-hole 34 from the side on which the bolt supporting face 36 of the hub spindle 23 is formed to fasten the bolt 80 with the hub wheel 20.

The constant velocity joint 60 is disposed at a position closer to the vehicle body than the hub spindle 23. As the constant velocity joint 60, known constant velocity joints, such as a Rzeppa constant velocity joint or a Birfield constant velocity joint, may be used, as illustrated in FIG. 1 and FIG. 2. The constant velocity joint 60 includes a joint inner ring 62, a joint outer ring 70, a plurality of balls 63, and a cage 64. The joint inner ring 62 is fixedly connected to one end of the drive shaft 61. The balls 63 are disposed between the joint inner ring 62 and the joint outer ring 70. The cage 64 holds the balls 63. The joint outer ring 70 includes a cup-shaped outer ring tubular portion 71 and the tubular projecting portion 73. The tubular projecting portion 73 is formed integrally with and projects from a center portion of an end face 72 on the outer periphery of the outer ring tubular portion 71. A second side-face spline 78 is formed on the end face 72 of the outer ring tubular portion 71 so as to be opposed to the first side-face spline 28. A hole portion is formed in the tubular projecting portion 73 located at the center portion, and an internal threaded portion 75 is formed on the inner peripheral face of the tubular projecting portion 73.

As illustrated in FIG. 1 and FIG. 2, the tubular projecting portion 73 is inserted into the through-hole 34 of the hub spindle 23 from the small diameter shaft portion 26 side. In the meantime, the bolt 80 with a washer, which will be described later, is inserted into the through-hole 34 of the hub spindle 23 from the side where the bolt supporting face 36 is formed, so as to be screwed to the internal threaded portion 75 of the tubular projecting portion 73. In this way, the hub spindle 23 is connected to the tubular projecting portion 73. The first side-face spline 28 on the end face 22 of the hub spindle 23 and the second side-face spline 78 on the end face 72 of the joint outer ring 70 (the outer ring tubular portion 71) of the constant velocity joint 60, the second side-face spline 78 facing the end face 22, are engaged with each other, so that the hub wheel 20 and the constant velocity joint 60 are connected to each other so that torque is transmittable therebetween.

The bolt 80 with a washer will be described below. As illustrated in FIG. 2, the bolt 80 with a washer has an external threaded portion 83 which is screwed to the internal threaded portion 75 formed in the tubular projecting portion 73 of the joint outer ring 70 of the constant velocity joint 60 described above. The external threaded portion 83 is formed at a distal end portion of a shaft portion 82. The washer portion 84 that is brought into contact with the bolt supporting face 36 of the hub spindle 23 is formed on the outer periphery of the head 81 of the bolt 80 with a washer.

The vehicle bearing apparatus 10 is configured such that, for example, when the vehicle is travelling, torque of the drive shaft 61 is sequentially transmitted to the joint inner ring 62, the balls 63, and the joint outer ring 70 of the constant velocity joint 60, so that the joint outer ring 70 is rotated in the same direction as the rotational direction of the drive shaft 61. The torque transmitted to the constant velocity joint 60 is transmitted to the hub wheel 20 due to engagement between the first side-face spline 28 on the end face 22 of the hub spindle 23 of the hub wheel 20 and the second side-face spline 78 on the end face 72 of the joint outer ring 70 of the constant velocity joint 60. As a result, the wheels are rotated.

Figure 3:
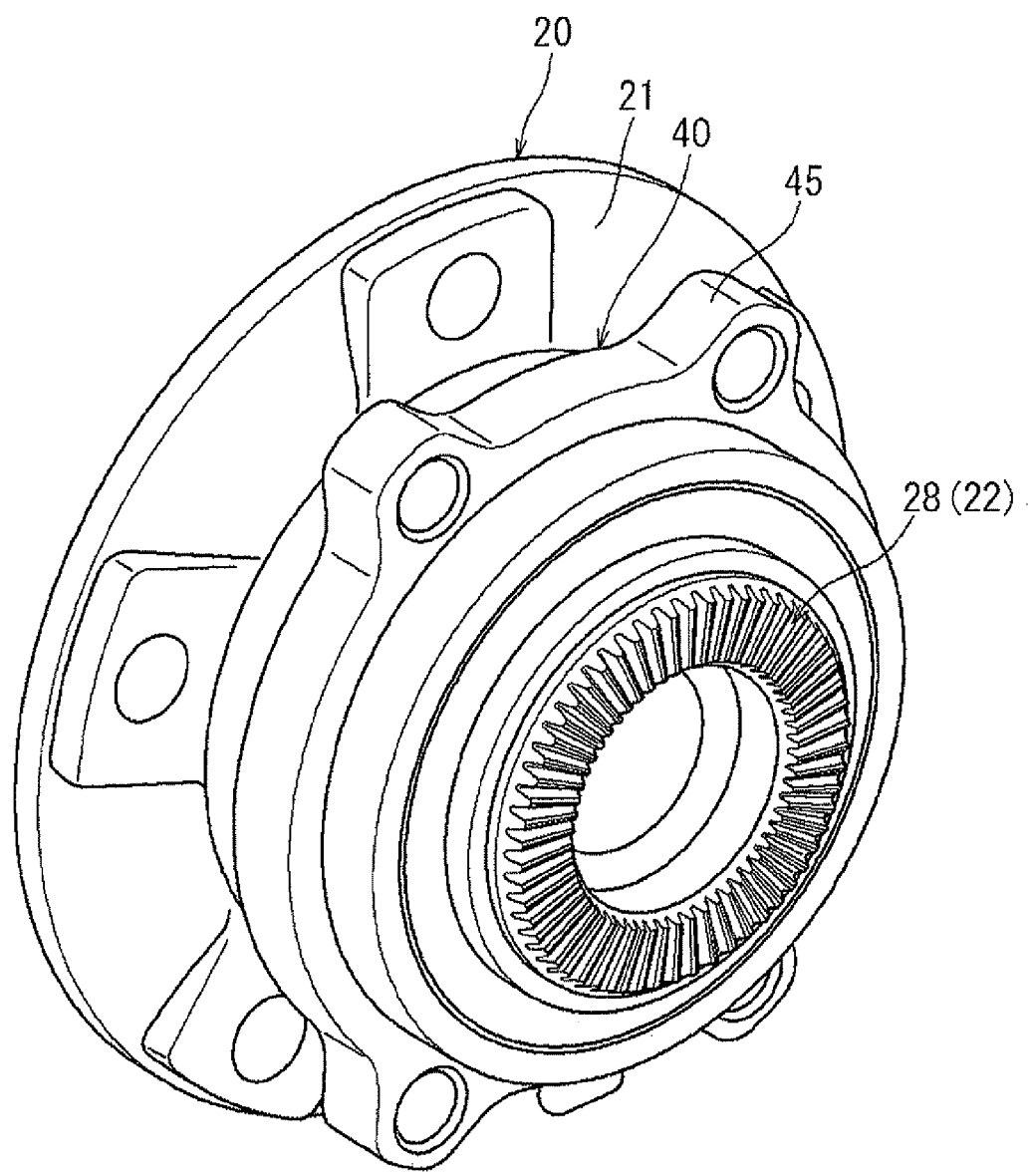
FIG. 3 is a perspective view of the vehicle bearing apparatus according to the embodiment from which a constant velocity joint is removed.
Figure 4:
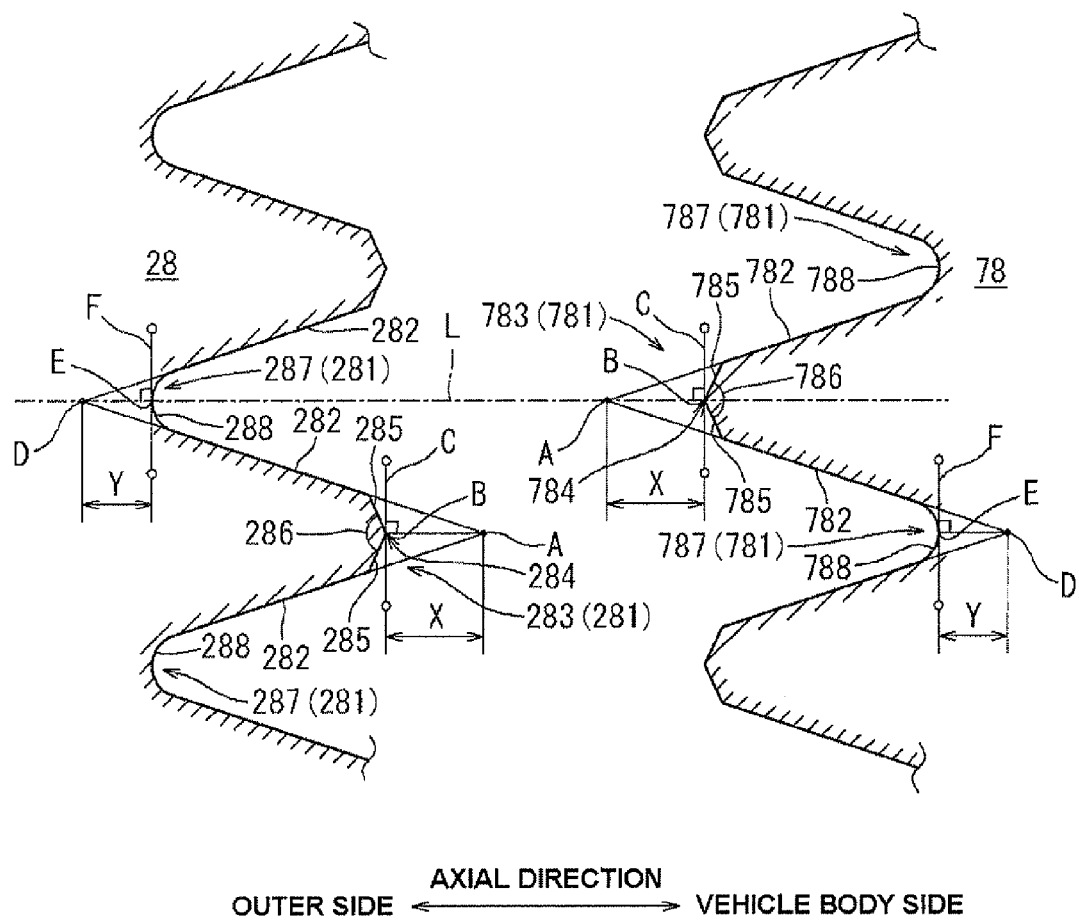
FIG. 4 is a schematic view for describing shapes of a first side-face spline and a second side-face spline of the vehicle bearing apparatus according to the embodiment.
Figure 5:
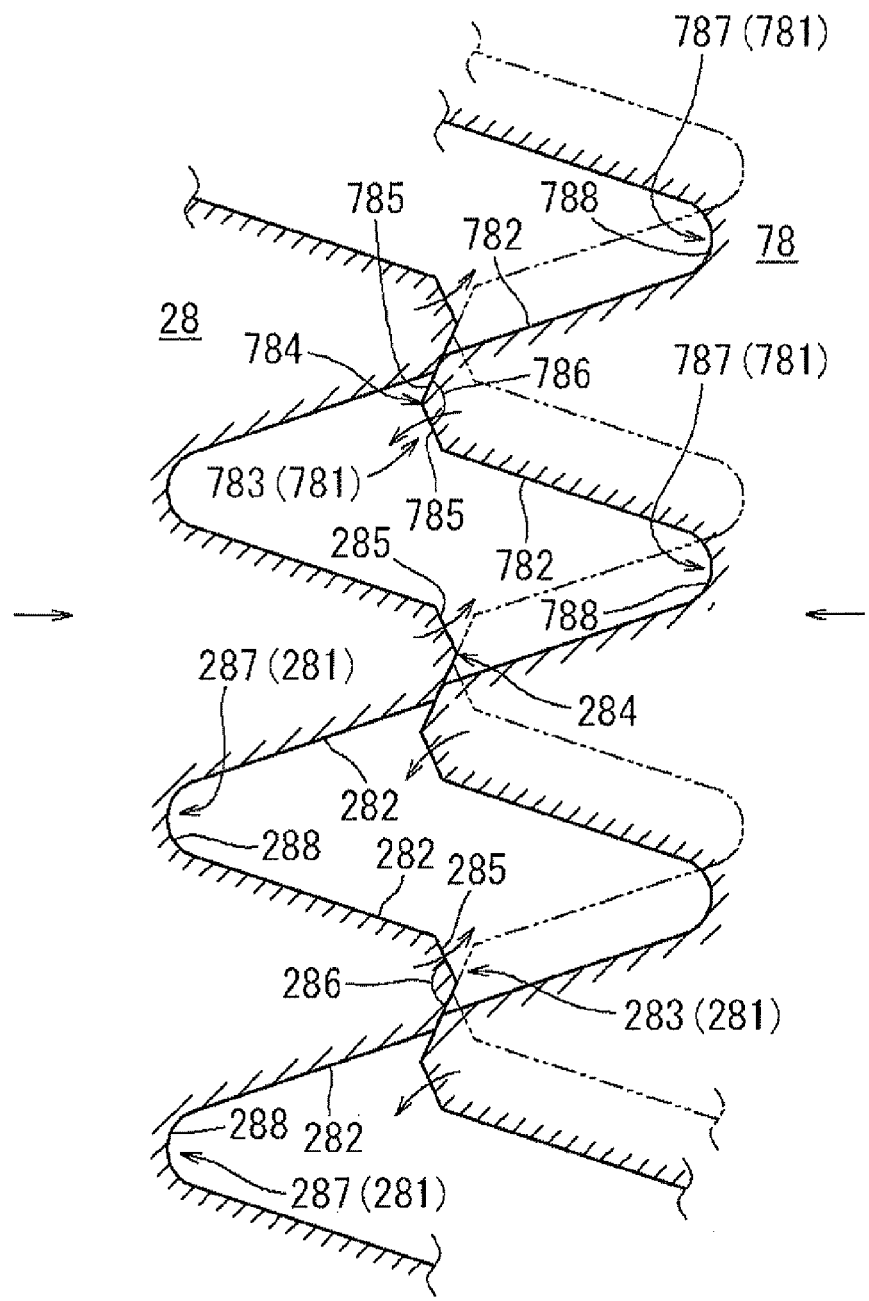
FIG. 5 is a schematic view illustrating a state where the first side-face spline and the second side-face spline of the vehicle bearing apparatus according to the embodiment are opposed to each other and receive pressure applied in the axial direction.
Figure 6:
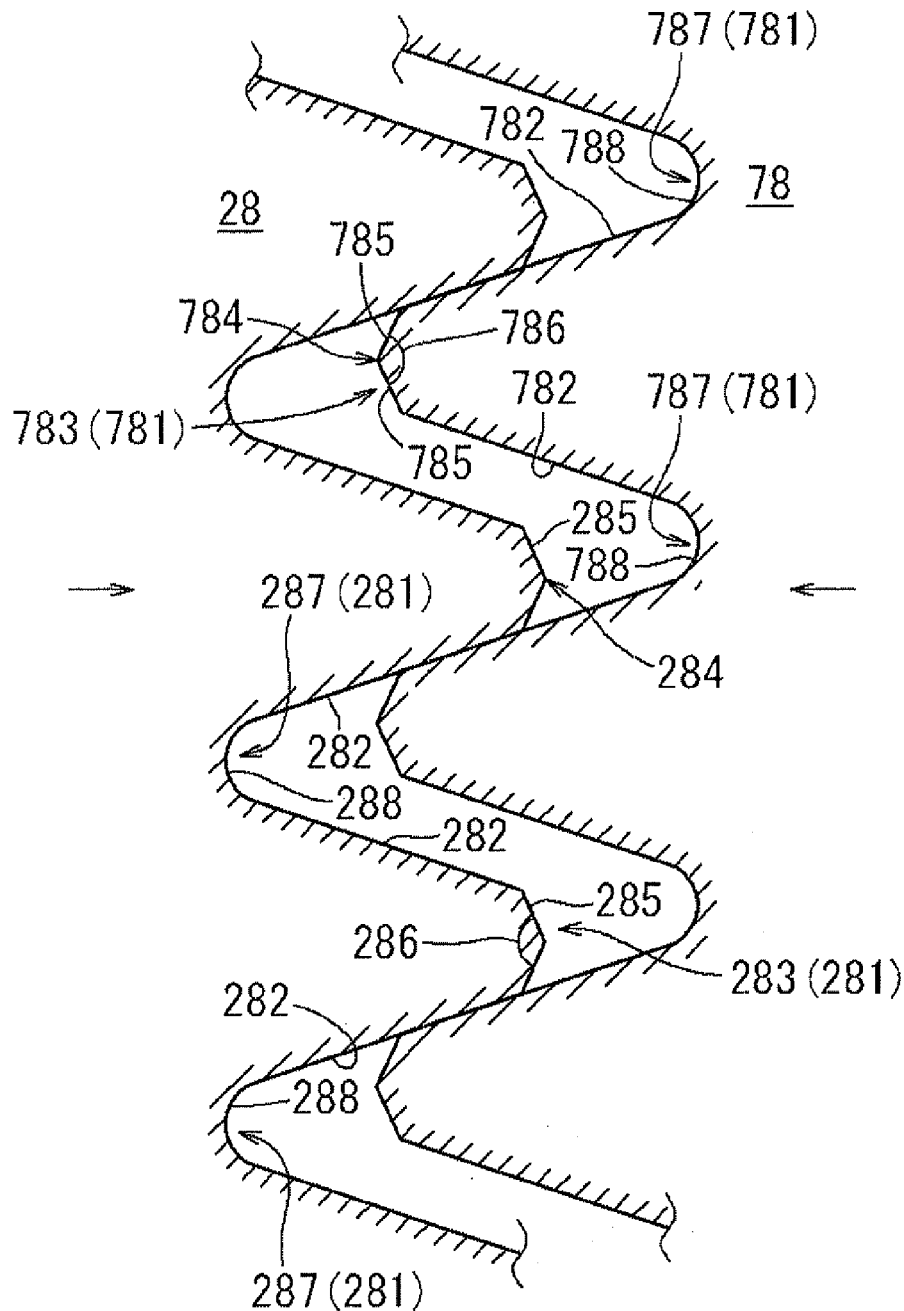
FIG. 6 is a schematic view illustrating a state where the first side-face spline and the second side-face spline of the vehicle bearing apparatus according to the embodiment rotate relative to each other.
Figure 7:
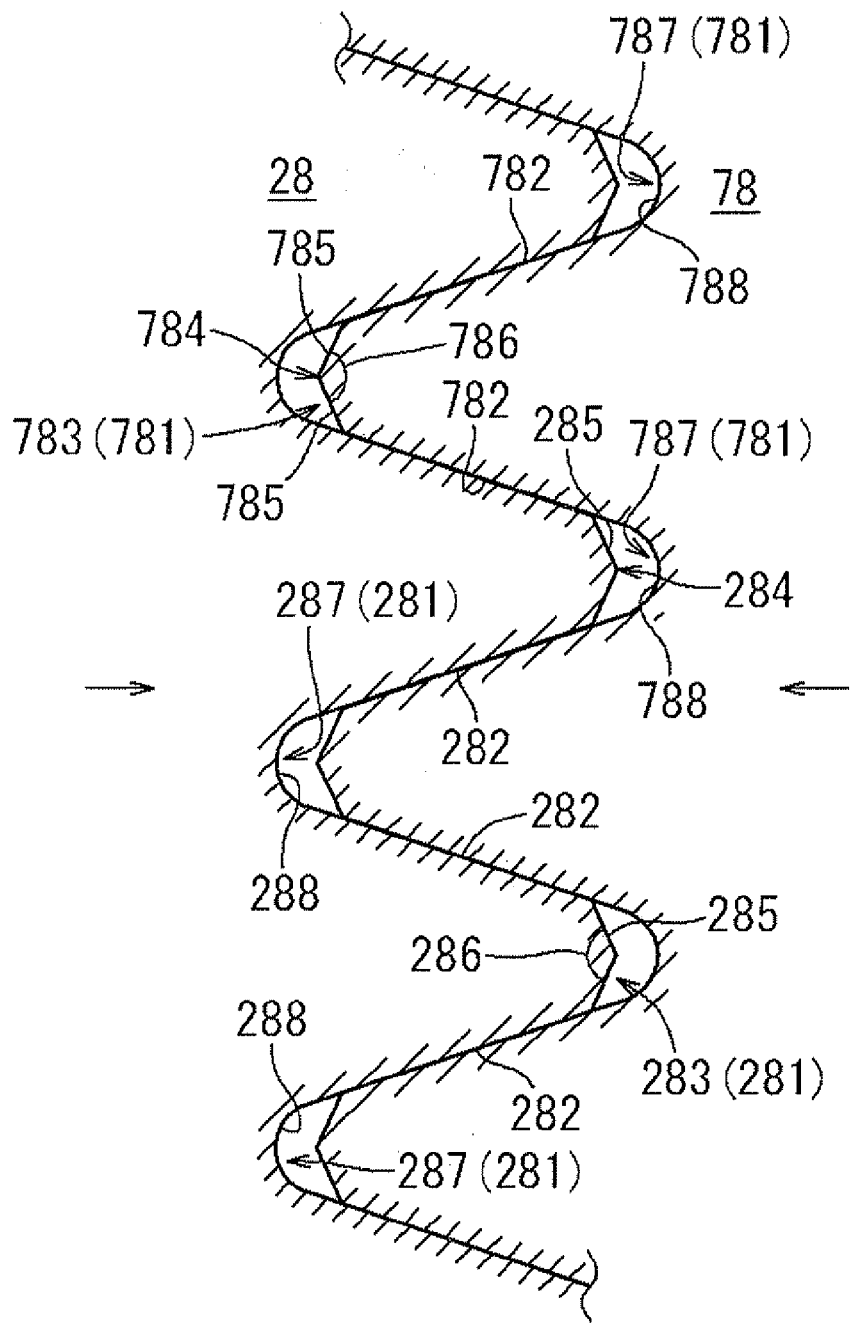
FIG. 7 is a schematic view illustrating a state where the first side-face spline and the second side-face spline of the vehicle bearing apparatus according to the embodiment are engaged with each other upon reception of pressure applied in the axial direction.

As illustrated in FIG. 3 and FIG. 4, an engagement surface 281 of the first side-face spline 28 has an annular engagement surface in which projected tooth chevrons 283 and recessed tooth valleys 287 are alternately formed so as to be continuous with each other. Although not illustrated herein, an engagement surface 781 of the second side-face spline 78 also has an annular engagement surface in which projected tooth chevrons 783 and recessed tooth valleys 787 are alternately formed so as to be continuous with each other. Therefore, when the hub spindle 23 is fitted to the constant velocity joint 60, even if the engagement between the first side-face spline 28 and the second side-face spline 78 are incomplete, for example, as illustrated in FIG. 5, by tightening the bolt 80 with a washer, pressure is applied to the engagement surface 281 of the first side-face spline 28 and the engagement surface 781 of the second side-face spline 78 in the axial direction as illustrated by an arrow in FIG. 4, that is, in a direction perpendicular to the engagement surface 281 and the engagement surface 781. Upon reception of the pressure applied in the axial direction as illustrated in FIG. 5 and FIG. 6, tooth tips 284 of the engagement surface 281 of the first side-face spline 28 and tooth tips 784 of the engagement surface 781 of the second side-face spline 78 make line contact with each other. Then, the tooth tips 284 slip down over tip tilted surfaces 785 and move toward bottom lands 788. Similarly, the tooth tips 784 slip down over tip tilted surfaces 285 and move toward bottom lands 288. Thus, the first side-face spline 28 and the second side-face spline 78 rotate relative to each other, so that flat portions of tooth flanks 282 and flat portions of tooth flanks 782 gradually make surface contact with each other. In a state where the tightening of the bolt 80 with a washer is finished as illustrated in FIG. 7, the assembly is finished in a state where the engagement surfaces 281 of the first side-face spline 28 and the engagement surfaces 781 of the second side-face spline 78 are normally engaged with each other. When the hub spindle 23 is rotated via the constant velocity joint 60 in the state where the first side-face spline 28 and the second side-face spline 78 are normally engaged with each other, a stress in a rotational direction is applied to a region of contact between the first side-face spline 28 and the second side-face spline 78.

The shape of the first side-face spline 28 will be described in detail below. As illustrated in FIG. 4, each tooth chevron 283 of the engagement surface 281 of the first side-face spline 28 has the tooth tip 284 formed into a projecting shape by the tip tilted surfaces 285 extending from the tooth flanks 282 that constitute the tooth chevron 283, and tilted with respect to the tooth flanks 282 in such directions that the tip tilted surfaces 285 intersect each other. An internal angle 286 of the tooth tip 284, formed by the tip tilted surfaces 285, is set to be less than 180 degrees. Each tooth valley 287 of the engagement surface 281 of the first side-face spline 28 has the bottom land 288, at which surfaces extending from the tooth flanks 282 and constituting the tooth valley 287 in such directions that the surfaces are tilted with respect to the tooth flanks 282 are connected to each other. In the first side-face spline 28, the tooth chevrons 283 and the tooth valleys 287 are formed at the same time that a process of clinching the end face 22 of the hub spindle 23 is performed.

The clinching process is performed, for example, by a clinching tool. The clinching tool (not shown) has a columnar projection that is inserted into the through-hole 34 as illustrated in FIG. 2, and a plurality of teeth used to form the engagement surface 281 of the first side-face spline, the teeth being formed on an annular surface around the columnar projection. The inner ring 31 is fitted onto the small-diameter shaft portion 26 of the hub spindle 23 with an end portion of the tubular hub spindle 23 projected from the inner ring 31 by a predetermined amount. Then, the columnar projection of the clinching tool is inserted into the through-hole 34 of the hub spindle 23. After that, in a state where the clinching tool is inserted into the through-hole 34 of the hub spindle 23, the clinching tool is oscillated with a predetermined tilt angle with respect to a rotational central axis L. The end portion of the hub spindle 23 projected from the inner ring 31 is clinched radially outward so as to be formed into the clinched portion 27, and the engagement surface 281 of the first side-face spline is formed on the end face 22 of the hub spindle 23, which is on the vehicle body side. The details are described in, for example, Japanese Patent Application Publication No. 2011-31682 (JP 2011-31682 A).

Similarly, the shape of the second side-face spline 78 will be described in detail below. As illustrated in FIG. 4, each tooth chevron 783 of the engagement surface 781 of the second side-face spline 78 has the tooth tip 784 formed into a projecting shape by the tip tilted surfaces 285 extending from the tooth flanks 282 that constitute the tooth chevron 783, and tilted with respect to the tooth flanks 282 in such directions that the tip tilted surfaces 785 intersect each other. An internal angle 786 of the tooth tip 784, formed by the tip tilted surfaces 785, is set to be less than 180 degrees. Each tooth valley 787 of the engagement surface 781 of the second side-face spline 78 has the bottom land 788, at which surfaces extending from the tooth flanks 782 constituting the tooth valley 787 in such directions that the surfaces are tilted with respect to the tooth flanks 782, are connected to each other. In the second side-face spline 78, the tooth chevrons 783 and the tooth valleys 787 are formed at the same time that the constant velocity joint 60 is formed by press forming.

As illustrated in FIG. 4, the tooth tip 284, 784 and the bottom land 288, 788 have the following relationships.

<Tooth Tip 284, 784>

A virtual intersection at which the tooth flanks 282, 782 intersect each other when being extended on the tooth tip 284, 784 side is referred to as a tooth tip virtual intersection A. An intersection at which the tip tilted surfaces 285, 785 intersect each other is referred to as a tooth tip vertex B (that is, the tooth tip 284, 784). Among virtual planes perpendicular to the rotational central axis L of the hub spindle 23, a virtual plane intersecting the tooth tip vertex B is referred to as a first virtual plane C. A perpendicular distance between the tooth tip virtual intersection A and the first virtual plane C is referred to as a tooth tip-side perpendicular distance X.

<Bottom Land 288, 788>

A virtual intersection at which the tooth flanks 282, 782 intersect each other when being extend on the bottom land 288, 788 side is referred to as a bottom land virtual intersection D. Among virtual planes perpendicular to the rotational central axis L of the hub spindle 23 and intersecting the bottom land 288, 788, a virtual plane closest to the bottom land virtual intersection D is referred to as a second virtual plane F. In the present embodiment, the bottom land 288, 788 is formed in a curved recessed shape and has a bottom land vertex E. Therefore, the second virtual plane F is a virtual plane intersecting the bottom land vertex E. A perpendicular distance between the bottom land virtual intersection D and the second virtual plane F is referred to as a bottom land-side perpendicular distance Y. In the above-described relationships, the tooth tip-side perpendicular distance X is set larger than the bottom land-side perpendicular distance Y.

Figure 8:
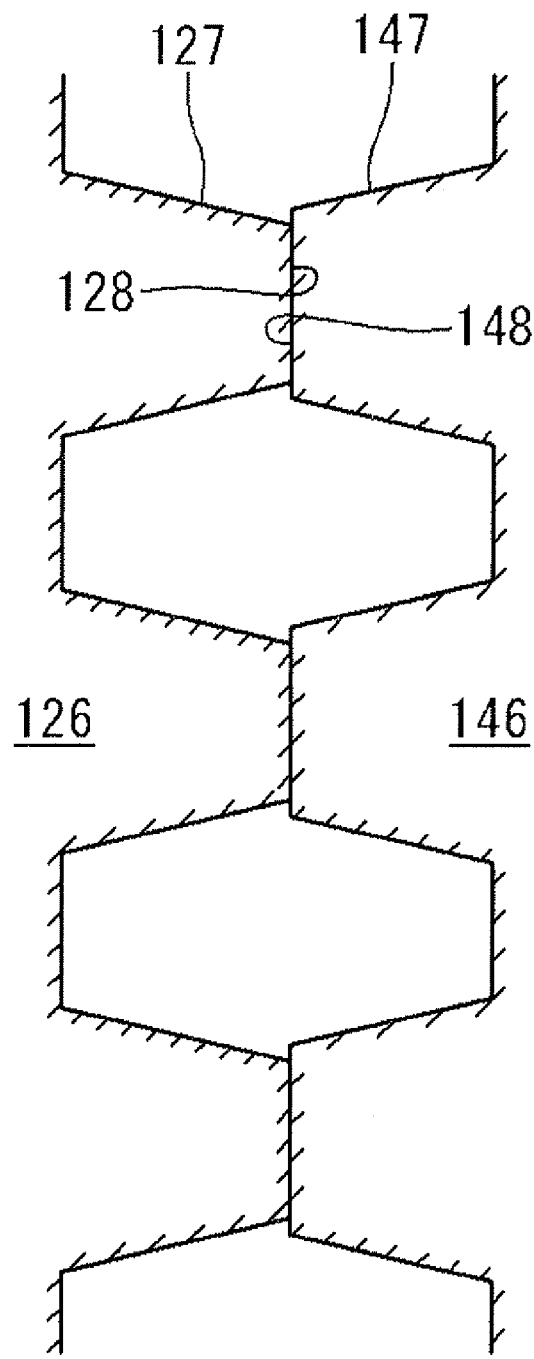
FIG. 8 is a schematic view of side-face splines of a conventional vehicle bearing apparatus, illustrating a state where the side-face splines receive pressure applied in the axial direction while flat tooth tips thereof are opposed to each other.

Thus, the vehicle bearing apparatus 10 according to the present embodiment has the following operations and effects. As illustrated in FIG. 8, the side-face splines 126, 146 of the conventional hub spindle of the hub wheel and the conventional constant velocity joint are configured such that the tooth tips 128, 148 are both formed as flat surfaces. Therefore, the side-face splines 126, 146 may make surface contact with each other in a state where the tooth tips 128, 148 are opposed to each other. In the state where the side-face splines 126, 146 make surface contact with each other, even if pressure is applied to the hub spindle of the hub wheel and the constant speed joint in the axial direction, a normal engagement state in which the tooth flanks 127, 147 of the side-face splines 126, 146 make surface contact with each other is not achieved, and the hub spindle of the hub wheel and the constant speed joint are connected in an inappropriate engagement state. However, the side-face splines in the vehicle bearing apparatus 10 in the present embodiment are configured such that, as illustrated in FIG. 4 to FIG. 7, each tooth chevron 283 of the first side-face spline 28 and each tooth chevron 783 of the second side-face spline 78 have the projected tooth tip 284 and the projected tooth tip, 784, respectively. Further, the internal angle 286, 786 of the tooth tip 284, 784, formed by the tip tilted surfaces 285, 785, is formed to be less than 180 degrees. Therefore, even when the tooth tips 284, 784 formed by the tip tilted surfaces 285, 785 are opposed to each other and brought into contact with each other, the tooth tips 284, 784 make line contact with each other. Therefore, the tooth tips 284 slip down over the tip tilted surfaces 785 and move toward the bottom lands 788. Similarly, the tooth tips 784 slip down over the tip tilted surfaces 285 and move toward the bottom lands 288. Thus, the first side-face spline 28 and the second side-face spline 78 rotate relative to each other, and the flat portions of the tooth flanks 282 and the flat portions of the tooth flanks 782 make surface contact with each other, thereby achieving a normal engagement state.

Figure 9:
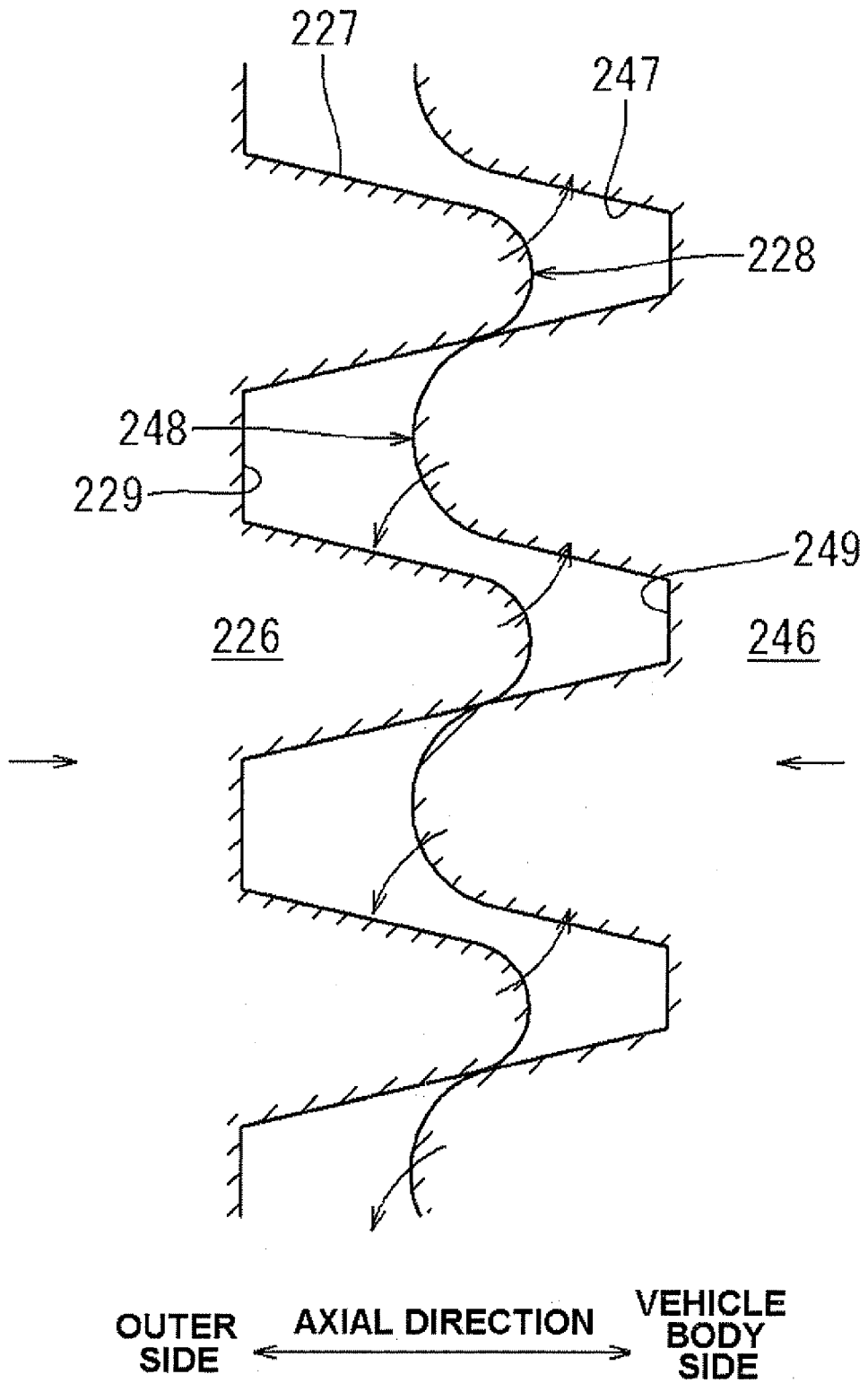
FIG. 9 is a schematic view of side-face splines of a conventional vehicle bearing apparatus, illustrating a state where the side-face splines with tooth tips having a curved surface are opposed to each other and receive pressure applied in the axial direction.

As illustrated in FIG. 9, regions of contact between the conventional side-face spline 226 and side-face spline 246 are the flat portions of the tooth flanks 227 and the flat portions of the tooth flanks 247. However, in order to join the tooth flanks 227 and the tooth tip 228 together smoothly at the boundaries, the tooth flanks 227 and the tooth tip 228 are joined together such that portions near each boundary have a partially round shape. Therefore, the portions of the tooth flanks 227, which are near the boundaries with the tooth tip 228, are not flat and do not engage with the tooth flanks 247. Therefore, the amount of the flat portion of each tooth flank 227 is decreased, which causes a decrease in the engagement area. The same applies to the boundaries between the tooth flanks 247 and the tooth tip 248. However, the side-face splines in the vehicle bearing apparatus 10 in the present embodiment are configured such that, as illustrated in FIG. 4 to FIG. 7, the tooth tip 284, 784 is formed into a projecting shape by the tip tilted surfaces 285, 785 extending from the tooth flanks 282, 782 constituting the tooth chevron 283, 783 and tilted with respect to the tooth flanks 282, 782 in such directions that the tip tilted surfaces 285, 785 intersect each other. Accordingly, it is not necessary to form joint portions between the tip tilted surfaces 285 and the tooth flanks 282 and joint portions between the tip tilted surfaces 785 and the tooth flanks 782 into round joint portions. This makes it possible to secure a sufficient engagement area without decreasing the amount of the flat portions of the tooth flanks 282, 782.

Figure 10:
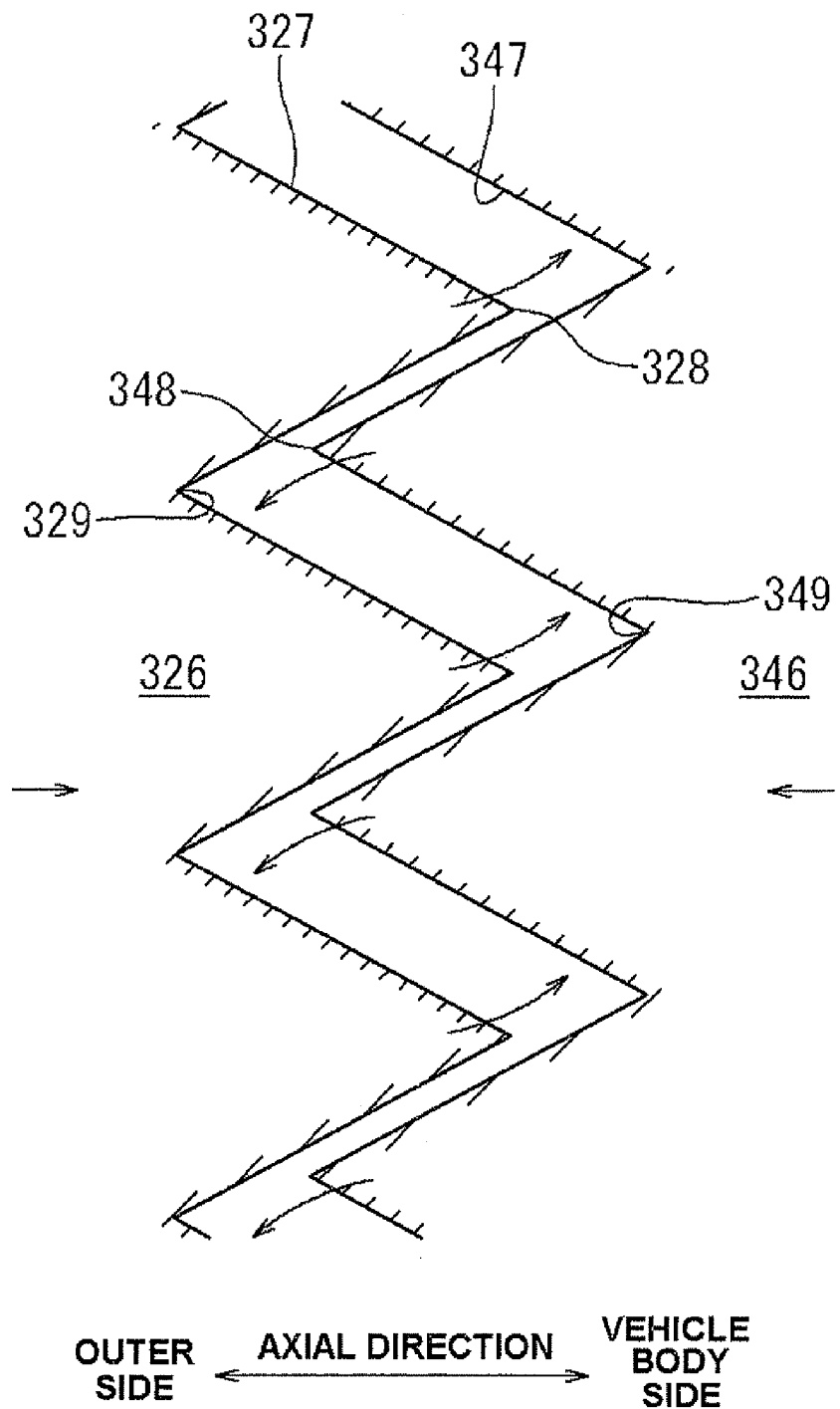
FIG. 10 is a schematic view of side-face splines of a conventional vehicle bearing apparatus, illustrating a state where the side-face splines in which the whole tooth has a shape of an acute triangle are opposed to each other and receive pressure applied in the axial direction.

As illustrated in FIG. 10, the whole tooth of each of the side-face splines 326, 346 is formed in a shape of an acute triangle, and each of the bottom lands 329, 349 has a shape corresponding to the acute triangle. Therefore, if the tooth tips 328, 348 do not completely match the bottom lands 329, 349, backlash may occur after the hub spindle of the hub wheel is fitted to the constant velocity joint. However, the side-face splines in the vehicle bearing apparatus 10 in the present embodiment is configured such that the tooth tip-side perpendicular distance X is larger than the bottom land-side perpendicular distance Y, as illustrated in FIG. 4 to FIG. 7. Therefore, even if the shapes of the bottom lands 288, 788 do not completely match the shapes of the tooth tips 284, 784, it is possible to suppress occurrence of backlash after the engagement surfaces 281 of the first side-face spline 28 and the engagement surfaces 781 of the second side-face spline 78 are engaged with each other.

The embodiment of the invention has been described above, but the vehicle bearing apparatus in the invention is not limited to the above-described embodiment, and may be implemented in various other embodiments within the scope of the invention. For example, in the above-described embodiment, a double row angular contact ball bearing is employed as a double row rolling bearing. However, the invention may be implemented even if a double row tapered roller bearing is used. In the above-described embodiment, each of the bottom lands 288, 788 is formed in a curved recessed shape and has the bottom land vertex E. However, as the shape of a bottom land, various shapes may be employed as long as the surfaces extending from tooth flanks in such directions that the surfaces are tilted with respect to the tooth flanks are connected to each other at the bottom land. For example, the bottom land may be configured such that surfaces extending from tooth flanks constituting a tooth valley in such directions that the surfaces are tilted with respect to the tooth flanks are connected to each other to foil a flat surface.

By employing the above-described configurations according to the invention, it is possible to provide the vehicle bearing apparatus configured to prevent the drive shaft and the hub spindle of the hub wheel from being connected to each other while the tooth flanks of the side-face splines are engaged with each other inappropriately, and to make it possible to both secure a sufficient area of engagement between the tooth flanks of the side-face splines and suppress occurrence of backlash during engagement.

What is claimed is:

1. A vehicle bearing apparatus in which a drive shaft is connected to a hub spindle of a hub wheel such that rotation of the drive shaft is transmittable to the hub spindle, wherein:
   a first side-face spline is formed on an end face of the hub spindle of the hub wheel;
   a constant velocity joint is provided at an end portion of the drive shaft;
   a second side-face spline is formed on an end face of the constant velocity joint, the end face being opposed to the first side-face spline on the end face of the hub spindle of the hub wheel;
   each of the first side-face spline and the second side-face spline has an annular engagement surface in which projected tooth chevrons and recessed tooth valleys are alternately formed so as to be continuous with each other;
   each of the tooth chevrons of the engagement surface of the first side-face spline and the tooth chevrons of the engagement surface of the second side-face spline has a tooth tip formed into a projecting shape by tip tilted surfaces extending from tooth flanks constituting the tooth chevron and tilted with respect to the tooth flanks in such directions that the tip tilted surfaces intersect each other;
   an internal angle of the tooth tip, formed by the tip tilted surfaces, is set to be less than 180 degrees;
   each of the tooth valleys of the engagement surface of the first side-face spline and the tooth valleys of the engagement surface of the second side-face spline has a bottom land at which surfaces extending from tooth flanks constituting the tooth valley in such directions that the surfaces are tilted with respect to the tooth flanks are connected to each other; and
   when a virtual intersection at which the tooth flanks intersect each other when being extended on the tooth tip side is referred to as a tooth tip virtual intersection; an intersection at which the tip tilted surfaces intersect each other is referred to as a tooth tip vertex; among virtual planes perpendicular to a rotational central axis of the hub spindle of the hub wheel, a virtual plane intersecting the tooth tip vertex is referred to as a first virtual plane; a perpendicular distance between the tooth tip virtual intersection and the first virtual plane is referred to as a tooth tip-side perpendicular distance X; a virtual intersection at which the tooth flanks intersect each other when being extended on the bottom land side is referred to as a bottom land virtual intersection: among virtual planes intersecting the bottom land, a virtual plane closest to the bottom land virtual intersection is referred to as a second virtual plane, and a perpendicular distance between the bottom land virtual intersection and the second virtual plane is referred to as a bottom land-side perpendicular distance Y, the tooth tip-side perpendicular distance X is larger than the bottom land-side perpendicular distance Y.

\* \* \* \* \*